(12) United States Patent  
Akkarakaran et al.

(10) Patent No.: US 11,304,116 B2  
(45) Date of Patent: Apr. 12, 2022

(54) CONNECTIVITY GRAPH FOR WIRELESS NETWORK ROUTING

(71) Applicant: QUALCOMM Incorporated, San Diego, CA (US)

(72) Inventors: Sony Akkarakaran, Poway, CA (US); Tao Luo, San Diego, CA (US); Junyi Li, Chester, NJ (US); Juan Montojo, San Diego, CA (US); Jung Ho Ryu, Fort Lee, NJ (US); Kapil Gulati, Hillsborough, NJ (US); Hong Cheng, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/947,658

(22) Filed: Aug. 11, 2020

(65) Prior Publication Data

US 2021/0051565 A1 Feb. 18, 2021

Related U.S. Application Data

(60) Provisional application No. 62/886,301, filed on Aug. 13, 2019.

(51) Int. Cl.
*H04W 40/24* (2009.01)
*H04W 40/12* (2009.01)
*H04W 24/10* (2009.01)

(52) U.S. Cl.
CPC ......... *H04W 40/246* (2013.01); *H04W 24/10* (2013.01); *H04W 40/12* (2013.01)

(58) Field of Classification Search
None
See application file for complete search history.

(56) References Cited

U.S. PATENT DOCUMENTS 5,949,760 A * 9/1999 Stevens ................ H04W 76/10 370/254
2013/0137441 A1* 5/2013 Kruglick ............... H04W 40/22 455/445

(Continued)

FOREIGN PATENT DOCUMENTS

EP 3410663 A1 12/2018
WO 2018113947 A1 6/2018

OTHER PUBLICATIONS

International Search Report and Written Opinion—PCT/US2020/070402—ISA/EPO—dated Dec. 23, 2020.

(Continued)

*Primary Examiner* — Brian S Roberts
(74) *Attorney, Agent, or Firm* — Danai Nelisile Mhembere; Harrity & Harrity, LLP

(57) ABSTRACT

Various aspects of the present disclosure generally relate to wireless communication. In some aspects, a first user equipment (UE) may determine a link quality for one or more links associated with the first UE. A link quality for a link of the one or more links may be based at least in part on one or more measurements associated with at least a subset of a plurality of beams of the link. The first UE may generate, based at least in part on the link quality for the one or more links associated with the first UE, a connectivity graph of at least a portion of a wireless network in which the first UE is included. The first UE may identify, using the connectivity graph, a route to a third UE included in at least the portion of the wireless network. Numerous other aspects are provided.

22 Claims, 10 Drawing Sheets

(56) References Cited

U.S. PATENT DOCUMENTS

2014/0171062 A1\* 6/2014 Fallgren ............... H04W 40/22
　　　　　　　　　　　　　　　　　　　　　455/422.1
2018/0375756 A1　12/2018　Lee et al.
2019/0028954 A1　1/2019　Lee et al.

OTHER PUBLICATIONS

Partial International Search Report—PCT/US2020/070402—ISA/EPO—dated Nov. 2, 2020.

\* cited by examiner

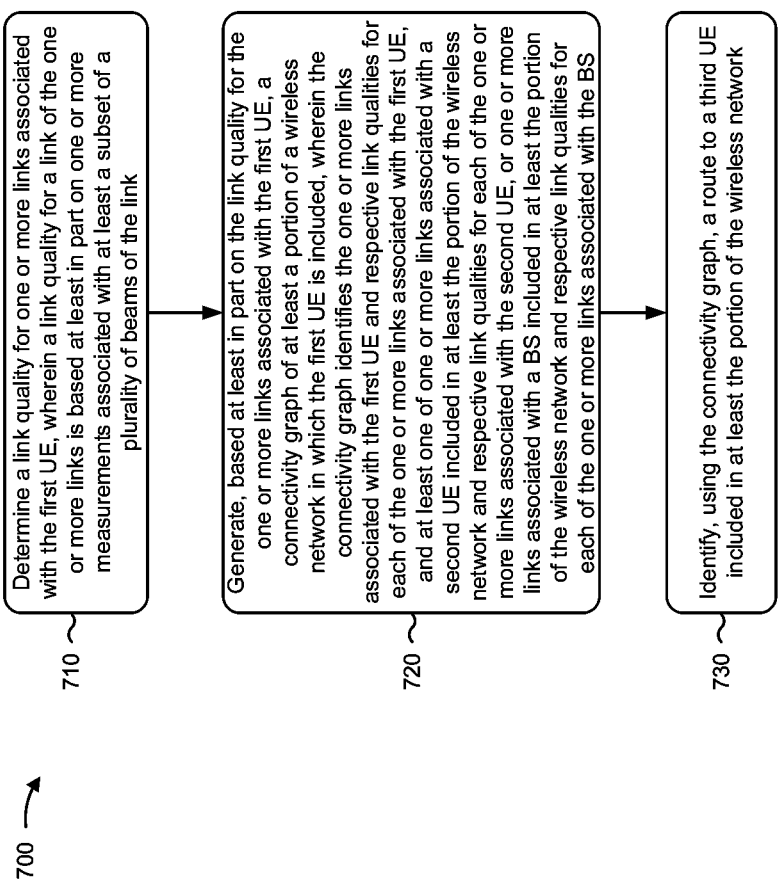

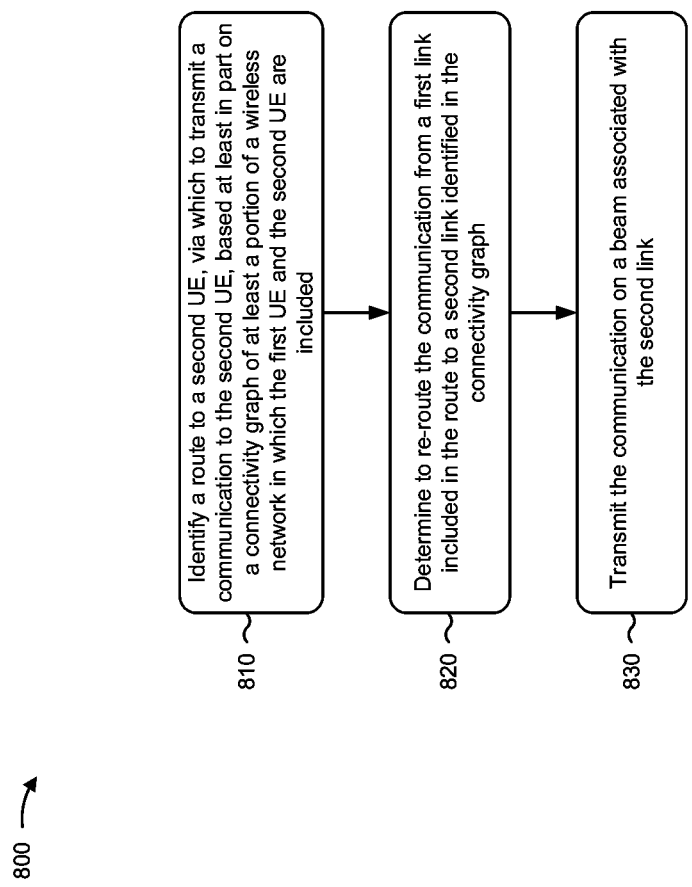

CONNECTIVITY GRAPH FOR WIRELESS NETWORK ROUTING

CROSS-REFERENCE TO RELATED APPLICATION

This Patent Application claims priority to U.S. Provisional Patent Application No. 62/886,301, filed on Aug. 13, 2019, entitled "CONNECTIVITY GRAPH FOR WIRELESS NETWORK ROUTING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for generating and/or using a connectivity graph for wireless network routing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a first user equipment (UE), may include determining a link quality for one or more links associated with the first UE, wherein a link quality for a link of the one or more links is based at least in part on one or more measurements associated with at least a subset of a plurality of beams of the link; generating, based at least in part on the link quality for the one or more links associated with the first UE, a connectivity graph of at least a portion of a wireless network in which the first UE is included, wherein the connectivity graph identifies the one or more links associated with the first UE and respective link qualities for each of the one or more links associated with the first UE, and at least one of one or more links associated with a second UE included in at least the portion of the wireless network and respective link qualities for each of the one or more links associated with the second UE, or one or more links associated with a base station (BS) included in at least the portion of the wireless network and respective link qualities for each of the one or more links associated with the BS; and identifying, using the connectivity graph, a route to a third UE included in at least the portion of the wireless network.

In some aspects, a method of wireless communication, performed by a first UE, may include identifying a route to a second UE, via which to transmit a communication to the second UE, based at least in part on a connectivity graph of at least a portion of a wireless network in which the first UE and the second UE are included; determining to re-route the communication from a first link included in the route to a second link identified in the connectivity graph; and transmitting the communication on a beam associated with the second link.

In some aspects, a UE for wireless communication may include memory and one or more processors operatively coupled to the memory. The memory and the one or more processors may be configured to determine a link quality for one or more links associated with the first UE, wherein a link quality for a link of the one or more links is based at least in part on one or more measurements associated with at least a subset of a plurality of beams of the link; generate, based at least in part on the link quality for the one or more links associated with the first UE, a connectivity graph of at least a portion of a wireless network in which the first UE is included, wherein the connectivity graph identifies the one or more links associated with the first UE and respective link qualities for each of the one or more links associated with the first UE, and at least one of one or more links associated with a second UE included in at least the portion of the wireless network and respective link qualities for each of the one or more links associated with the second UE, or one or more links associated with a BS included in at least the portion of the wireless network and respective link qualities for each of the one or more links associated with the BS; and identify, using the connectivity graph, a route to a third UE included in at least the portion of the wireless network.

In some aspects, a UE for wireless communication may include memory and one or more processors operatively coupled to the memory. The memory and the one or more processors may be configured to identify a route to a second UE, via which to transmit a communication to the second UE, based at least in part on a connectivity graph of at least a portion of a wireless network in which the first UE and the second UE are included; determine to re-route the communication from a first link included in the route to a second link identified in the connectivity graph; and transmit the communication on a beam associated with the second link.

In some aspects, a non-transitory computer-readable medium may store one or more instructions for wireless communication. The one or more instructions, when executed by one or more processors of a UE, may cause the one or more processors to determine a link quality for one or more links associated with the first UE, wherein a link quality for a link of the one or more links is based at least in part on one or more measurements associated with at least a subset of a plurality of beams of the link; generate, based at least in part on the link quality for the one or more links associated with the first UE, a connectivity graph of at least a portion of a wireless network in which the first UE is included, wherein the connectivity graph identifies the one or more links associated with the first UE and respective link qualities for each of the one or more links associated with the first UE, and at least one of one or more links associated with a second UE included in at least the portion of the wireless network and respective link qualities for each of the one or more links associated with the second UE, or one or more links associated with a BS included in at least the portion of the wireless network and respective link qualities for each of the one or more links associated with the BS; and identify, using the connectivity graph, a route to a third UE included in at least the portion of the wireless network.

In some aspects, a non-transitory computer-readable medium may store one or more instructions for wireless communication. The one or more instructions, when executed by one or more processors of a UE, may cause the one or more processors to: identify a route to a second UE, via which to transmit a communication to the second UE, based at least in part on a connectivity graph of at least a portion of a wireless network in which the first UE and the second UE are included; determine to re-route the communication from a first link included in the route to a second link identified in the connectivity graph; and transmit the communication on a beam associated with the second link.

In some aspects, a first apparatus for wireless communication may include means for determining a link quality for one or more links associated with the first apparatus, wherein a link quality for a link of the one or more links is based at least in part on one or more measurements associated with at least a subset of a plurality of beams of the link; means for generating, based at least in part on the link quality for the one or more links associated with the first apparatus, a connectivity graph of at least a portion of a wireless network in which the first apparatus is included, wherein the connectivity graph identifies the one or more links associated with the first apparatus and respective link qualities for each of the one or more links associated with the first apparatus, and at least one of one or more links associated with a second apparatus included in at least the portion of the wireless network and respective link qualities for each of the one or more links associated with the second apparatus, or one or more links associated with a BS included in at least the portion of the wireless network and respective link qualities for each of the one or more links associated with the BS; and means for identifying, using the connectivity graph, a route to a third apparatus included in at least the portion of the wireless network.

In some aspects, a first apparatus for wireless communication may include means for identifying a route to a second apparatus, via which to transmit a communication to the second apparatus, based at least in part on a connectivity graph of at least a portion of a wireless network in which the first apparatus and the second apparatus are included; means for determining to re-route the communication from a first link included in the route to a second link identified in the connectivity graph; and means for transmitting the communication on a beam associated with the second link.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7 and 8 are diagrams illustrating example processes performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
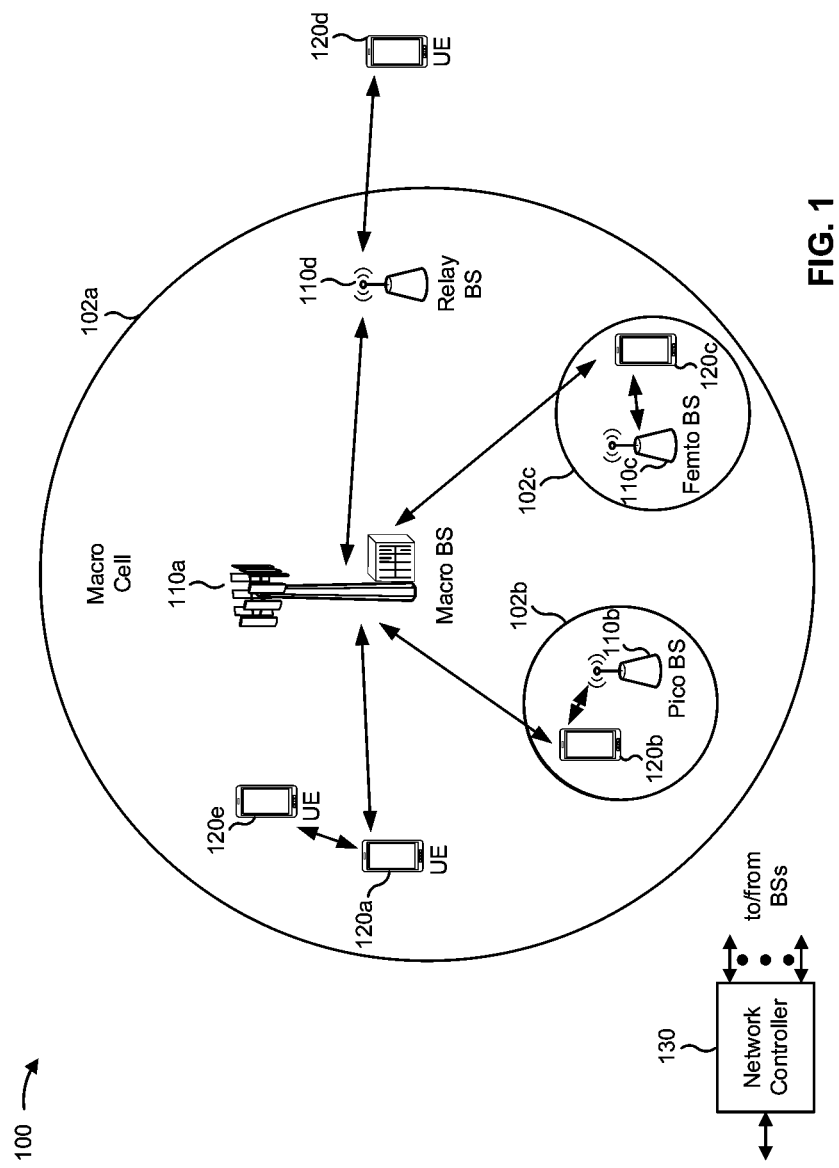
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
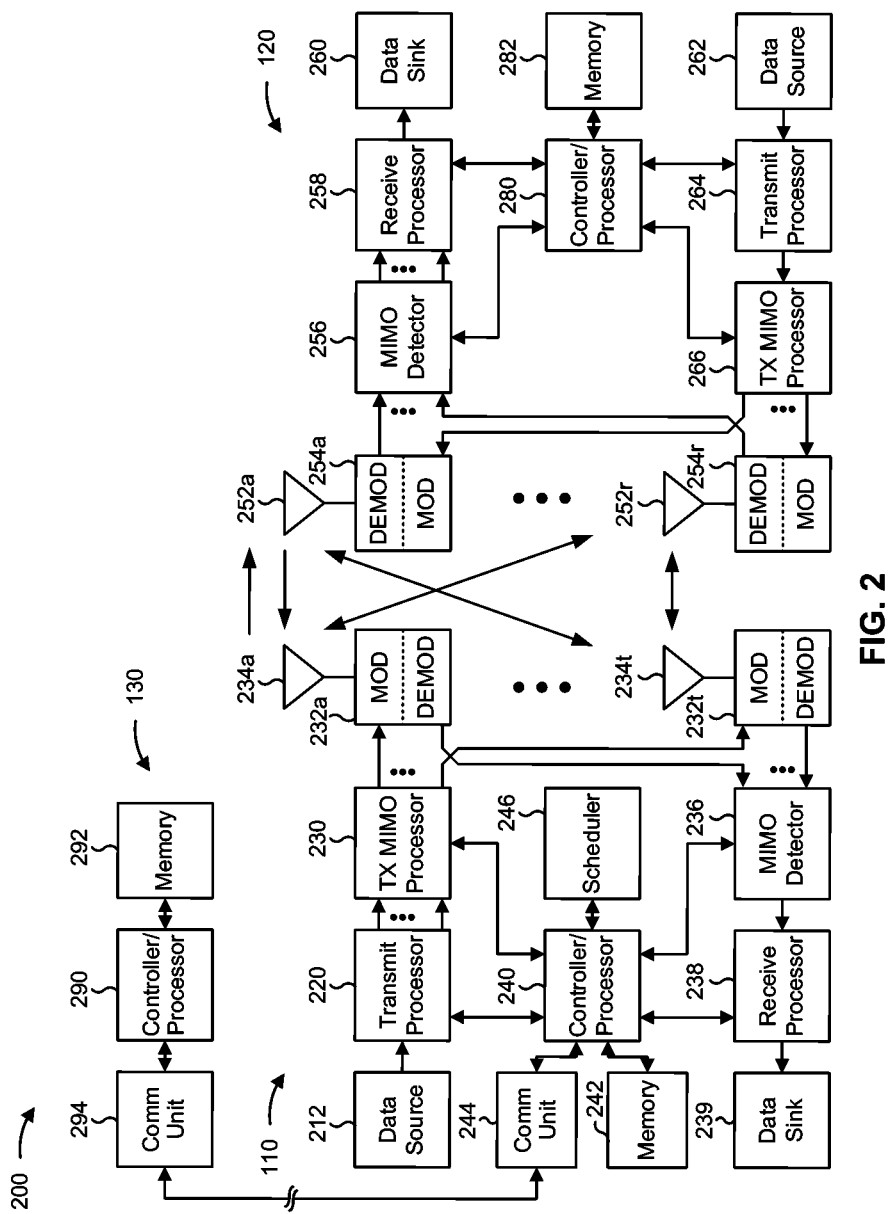
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with generating and/or using a connectivity graph for wireless network routing, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7, process 800 of FIG. 8, and/or other processes as described herein. A scheduler 246 may schedule UEs for data transmission on the downlink and/or uplink.

In some aspects, UE 120 may include means for determining a link quality for one or more links associated with the UE 120, wherein a link quality for a link of the one or more links is based at least in part on one or more measurements associated with at least a subset of a plurality of beams of the link, means for generating, based at least in part on the link quality for the one or more links associated with the UE 120, a connectivity graph of at least a portion of a wireless network 100 in which the UE 120 is included, wherein the connectivity graph identifies the one or more links associated with the UE 120 and respective link qualities for each of the one or more links associated with the UE 120, and at least one of one or more links associated with another UE 120 included in at least the portion of the wireless network 100 and respective link qualities for each of the one or more links associated with the other UE 120, or one or more links associated with a BS 110 included in at least the portion of the wireless network 100 and respective link qualities for each of the one or more links associated with the BS 110, means for identifying, using the connectivity graph, a route to a third UE 120 included in at least the portion of the wireless network, and/or the like. In some aspects, UE 120 may include means for identifying a route to another UE 120, via which to transmit a communication to the other UE 120, based at least in part on a connectivity graph of at least a portion of a wireless network in which the UE 120 and the other UE 120 are included, means for determining to re-route the communication from a first link included in the route to a second link identified in the connectivity graph, means for transmitting the communication on a beam associated with the second link, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
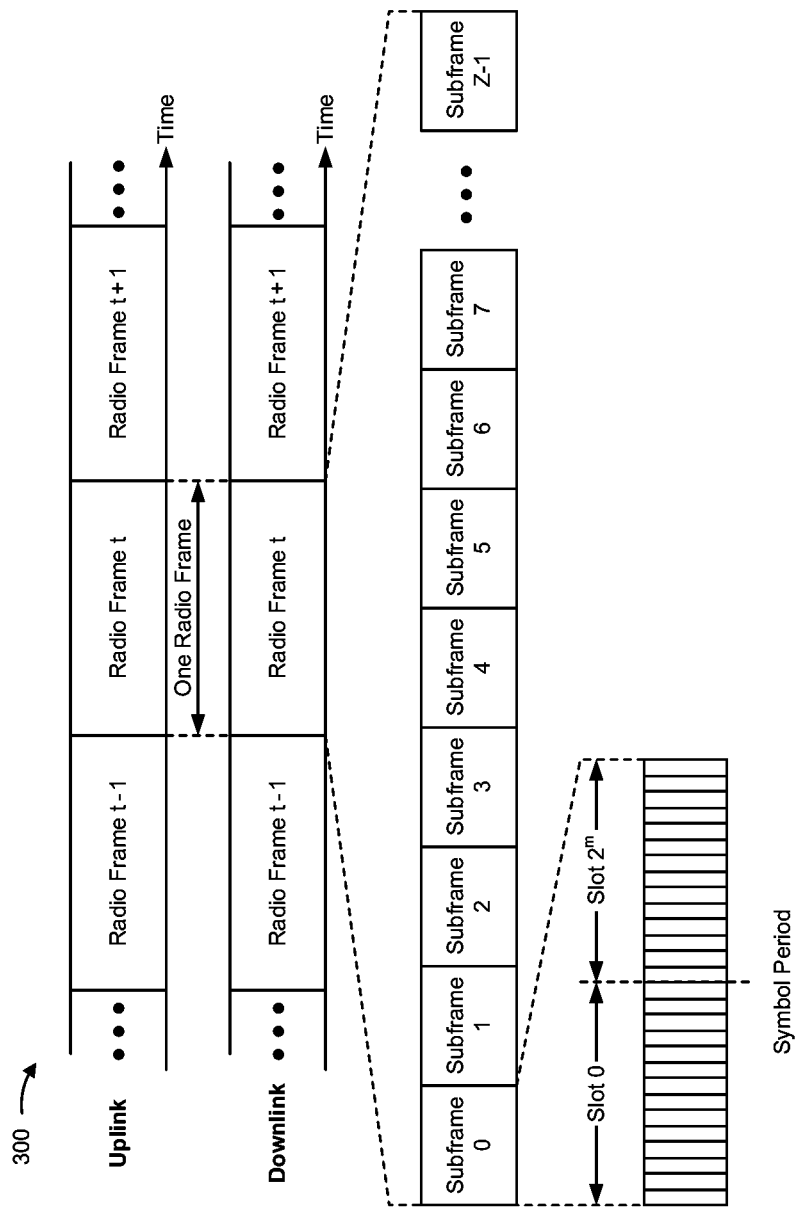
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z-1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
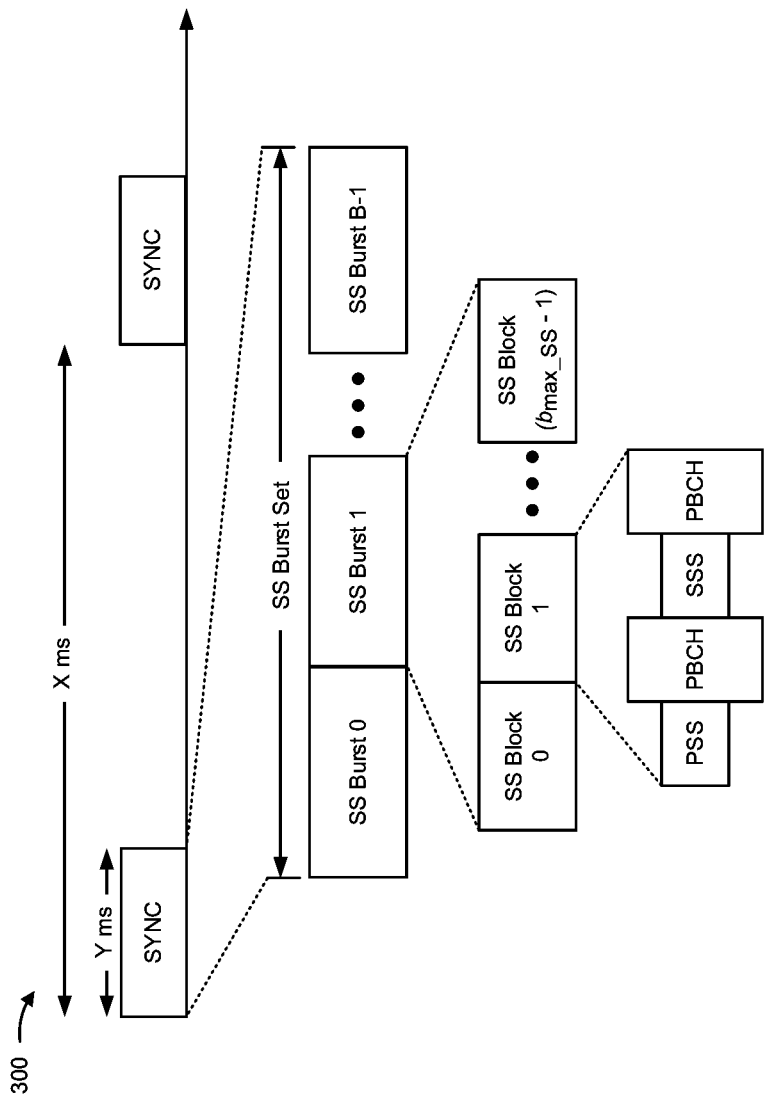
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
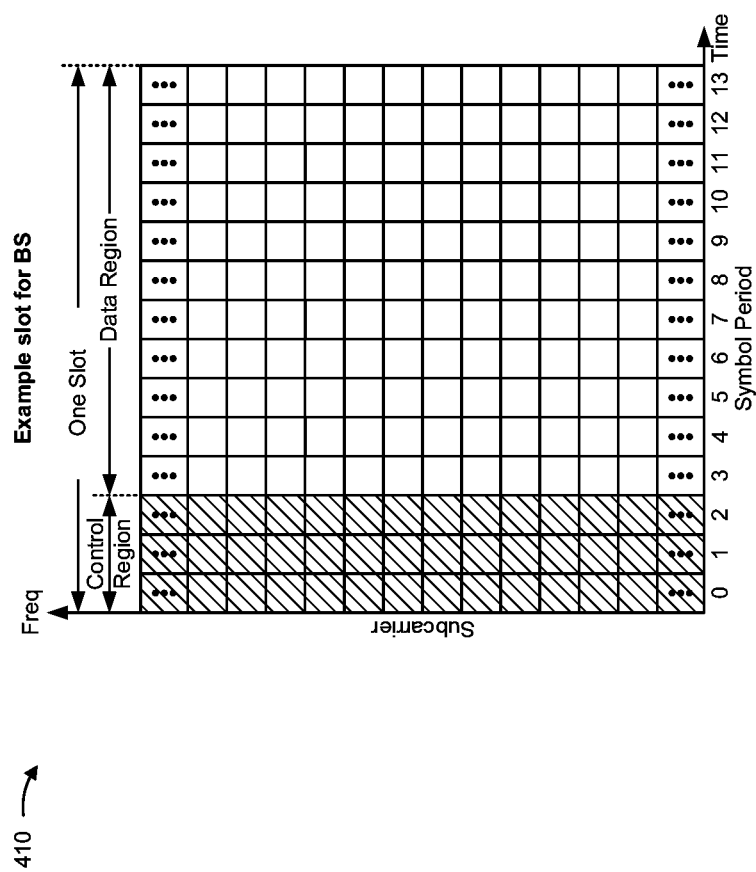
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In a wireless network, a UE may transmit a communication to another UE by routing the communication via one or more BSs included in the wireless network to the other UE. In some cases, if the wireless network supports sidelink communication (e.g., where two or more UEs are communicatively connected via a sidelink), the UE may additionally and/or alternatively route the communication via one or more additional UEs to the other UE. However, the UE may be unable to determine the best route via which to transmit the communication and/or may be unable to identify alternate routes to the other UE if, for example, the route experiences a beam failure, a blocked beam, a maximum permissible exposure (MPE) limitation, and/or another type of routing event.

Some aspects described herein provide techniques and apparatuses associated with generating and/or using a connectivity graph for wireless network routing. In some aspects, a UE may determine a link quality for each link associated with the UE, may receive information identifying a link quality for one or more links associated with other UEs and/or BSs, and/or the like. The UE may generate a connectivity graph that identifies the one or more links associated with the UE, the one or more links associated with the other UEs and/or BSs, and the link qualities associated with the links identified in the connectivity graph. In this way, the UE may identify a route via which to transmit a communication to another UE based at least in part on the connectivity graph, may identify alternate links and/or routes for re-routing a communication (e.g., if the route experiences a beam failure, a blocked beam, an MPE limitation, and/or another type of routing event), and/or the like.

Figure 5:
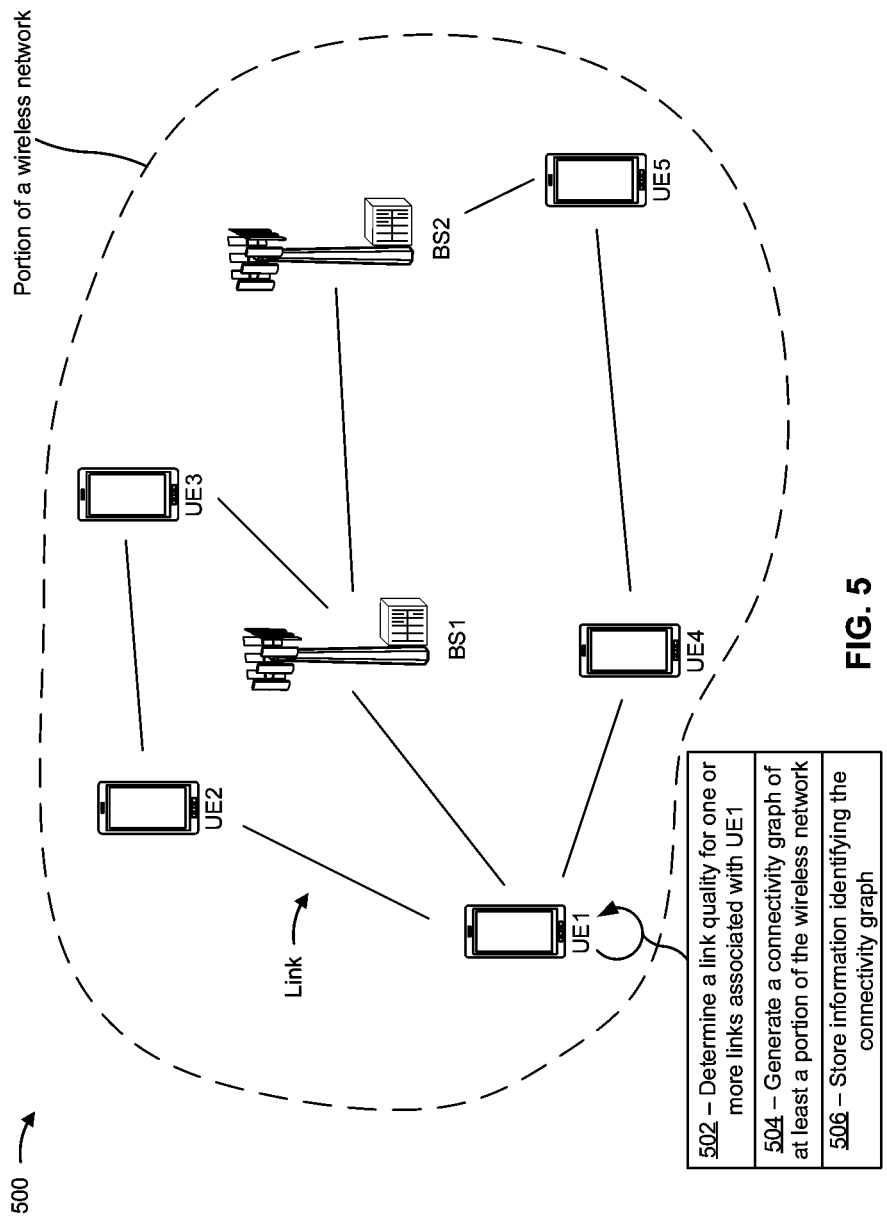
FIG. 5 is a diagram illustrating one or more examples of generating a connectivity graph for wireless network routing, in accordance with various aspects of the present disclosure.

FIG. 5 is a diagram illustrating one or more examples 500 of generating a connectivity graph for wireless network routing, in accordance with various aspects of the present disclosure. As shown in FIG. 5, example(s) 500 may include a plurality of UEs (e.g., UEs 120), such as UE1-UE5, a plurality of BSs (e.g., BSs 110), such as BS1 and BS2, and/or the like. In some aspects, example(s) 500 may include greater or fewer quantities of UEs and/or BSs than those illustrated in FIG. 5.

In some aspects, the UEs and/or BSs may be included in a portion of a wireless network (e.g., wireless network 100 and/or another wireless network). In some aspects, UE1 may generate a connectivity graph associated with the portion of the wireless network. In some aspects, UE2-UE5 and/or the BSs may also generate connectivity graphs for a portion of the wireless network (e.g., the same portion as UE1 and/or different portions). In some aspects, the portion of the wireless network for which a UE generates the connectivity graph may include only of some or all of the links between that UE and other UEs and/or BSs. For example, the immediate neighbors of the UE on the graph. In some aspects, the portion of the wireless network may further include links between those immediate neighbors and their neighbors. In some aspects, the links may be uni-directional or bi-directional, and the weights or costs associated with a link may be either the same or may be different depending on the direction of the link.

In some aspects, a connectivity graph may represent a connectivity topology of a wireless network or a portion thereof. For example, a connectivity graph may include a table, a graph, a database, an electronic file, and/or the like that identifies the UEs and/or BSs included in a portion of a wireless network and links between UEs (e.g., wireless sidelinks), between BSs (e.g., wireless and/or wired backhaul links, such as an X2/Xn backhaul link, a backhaul link via a core network, and/or the like), between UEs and BSs (e.g., wireless access links), and/or other entities included in the portion of the wireless network. In this way, a connectivity graph may be used to identify routes between UEs (e.g., by identifying one or more links between a UE and another UE), re-route communications between UEs, and/or the like.

As shown in FIG. 5, and by reference number 502, to generate a connectivity graph, UE1 may determine a link quality for one or more links associated with UE1. The one or more links may include sidelinks between UE1 and other UEs (e.g., a sidelink between UE1 and UE2, a sidelink between UE1 and UE4, and/or the like), access links between UE1 and BSs (e.g., an access link between UE1 and BS1 and/or the like), and/or the like.

In some aspects, UE1 may determine a link quality for a link based at least in part on one or more measurements associated with the link. For example, UE1 may perform one or more signal strength and/or signal quality measurements (e.g., RSRP, RSSI, RSRQ, CQI, and/or the like), one or more throughput measurements, one or more latency measurements, one or more block error rate measurements, and/or the like associated with the link, and may determine the link quality based at least in part on the results of the measurements. As another example, another UE or BS may perform the measurements, may provide the results of the one or more measurements to UE1 (e.g., as part of channel state information (CSI) feedback and/or other types of feedback), and UE1 may determine the link quality based at least in part on receiving an indication of the results.

In some aspects, UE1 may determine a link quality for a link by averaging the one or more measurements for the link, by selecting the best measurement results (e.g., highest signal strength measurements, lowest latency measurements, highest throughput measurements, lowest block error rate measurements, and/or the like) in a particular time duration, and/or the like. In this case, the link quality may be greater for a link associated with higher signal strength measurements, lower latency measurements, higher throughput measurements, lower block error rate measurements, and/or the like, and may be lower for a link associated with lower signal strength measurements, higher latency measurements, lower throughput measurements, higher block error rate measurements, and/or the like.

In some aspects, to determine a link quality for a link, UE1 may perform the one or more measurements for each beam of the link or for a subset of beams of the link. In this case, UE1 may determine the link quality for the link based at least in part on the results of the one or more measurements for each beam, based at least in part on the results of the one or more measurements for a subset of the beams, and/or the like.

In some aspects, UE1 may determine a link quality for a link based at least in part on one or more measurement parameters configured for performing one or more measurements for the link. For example, the one or more measurement parameters may identify a quantity of beams, associated with a link, for which UE1 is to average the one or more measurement results or is to select the best measurement results (e.g., N beams that produce the best measurement results). As another example, the one or more measurement parameters may indicate that UE1 is to average the one or more measurement results or select the best measurement results associated with the beams of the link that did not experience a failure in a threshold quantity of slots (e.g., M slots). As another example, the one or more measurement parameters may identify a measurement bandwidth of the one or more measurements, a time duration of the one or more measurements, and/or the like.

In some aspects, the one or more measurement parameters may be the same for each link associated with UE1. In some aspects, two or more links associated with UE1 may be configured with one or more different measurement parameters. For example, the quantity of beams for which UE1 is to average the one or more measurement results or select the best measurement results may be different for two or more links, the threshold quantity of slots may be different for two or more links, the measurement bandwidth may be different for two or more links, the time duration of the one or more measurements may be different for two or more links, and/or the like.

In some aspects, UE1 may determine a link quality for each direction on a link. For example, UE1 may determine a link quality of an inbound link of a sidelink between UE1 and UE2 (e.g., on which UE1 receives communications from UE2 on the sidelink) and a link quality of an outbound link of the sidelink (e.g., on which UE1 transmits communications to UE2 on the sidelink). As another example, UE1 may determine a link quality of a downlink link of an access link between UE1 and BS1 (e.g., on which UE1 receives communications from BS1 on the access link) and a link quality of an uplink of the access link (e.g., on which UE1 transmits communications to BS1 on the access link). In this case, UE1 may determine a link quality for an inbound link or downlink by performing one or more measurements of a reference signal or a received communication on the inbound link or downlink. Moreover, UE1 may determine a link quality for an outbound link or uplink based at least in part on reciprocity or beam correspondence with the inbound link or downlink (e.g., if the quantity of antennas and/or beams in each direction is the same) or based at least in part on receiving an indication of results for one or more measurements associated with the outbound link or uplink.

In some aspects, if UE1 determines the link quality for an outbound link or uplink based at least in part on reciprocity, UE1 may determine the link quality for an inbound link or downlink based at least in part on the results of one or more measurements associated with the inbound link or downlink, and may determine the link quality for the outbound link or uplink to be the same as the link quality for the inbound link or downlink. In some aspects, if UE1 determines the link quality for an outbound link or uplink based at least in part on reciprocity, UE1 may determine the link quality for an inbound link or downlink based at least in part on the results for one or more measurements associated with the inbound link or downlink, may adjust the results based at least in part on estimated differences between the inbound link or downlink and the outbound link or uplink (e.g., estimated differences in signal strength, signal quality, latency, throughput, and/or the like), and may determine the link quality for the outbound link or uplink based at least in part on the adjusted results.

As further shown in FIG. 5, and by reference number 504, UE1 may generate a connectivity graph of at least a portion of the wireless network. As indicated above, the connectivity graph may represent a connectivity topology of the portion of the wireless network. In this case, UE1 may generate the connectivity graph to identify the entities (e.g., UE2-UE5, BS1, BS2, and/or the like) included in the portion of the wireless network, may identify the links between the entities (e.g., sidelinks between the UEs, access links between BSs and UEs, links between BSs or network nodes, and/or the like), may identify respective link qualities for each of the links (e.g., in each direction on the links), and/or the like.

In some aspects, UE1 may generate the connectivity graph to include the links associated with UE1 and the corresponding link qualities determined by UE1. In some aspects, UE1 may generate the connectivity graph to include the links associated with UE2-UE5, BS1, and BS2 by receiving an indication of the links associated with UE2-UE5, BS1, and BS2, by receiving an indication of the link qualities associated with the links that are associated with UE2-UE5, BS1, and BS2, and/or the like.

As further shown in FIG. 5, and by reference number 506, UE1 may store information identifying the connectivity graph at UE1 so that UE1 may use the connectivity graph to route communications in the portion of the wireless network. For example, UE1 may store the information identifying the connectivity graph in a table, a graph, a database, a structured electronic file, a file system, a memory device, a storage device, and/or the like.

In some aspects, UE1 may periodically update the connectivity graph by periodically performing one or more measurements associated with the links identified in the connectivity graph, may update the connectivity graph by performing the one or more measurements based at least in part on one or more events in the wireless network, and/or the like. The time interval at which UE1 may perform the one or more measurements may be indicated in the one or more measurement parameters, may be indicated by a serving BS (e.g., BS1), and/or the like.

In some aspects, the one or more events may include detecting a beam failure, detecting a blocked beam, detecting a change in transmit power on one or more beams of a link identified in the connectivity graph, identifying new entities in the portion of the wireless network, and/or the like. In some aspects, the change in transmit power may be based at least in part on a maximum permissible exposure (MPE) limitation of UE1, the beam being scheduled to carry additional communications (e.g., which may be time-division multiplexed and/or frequency-division multiplexed on the beam), and/or the like.

In this way, UE1 may determine a link quality for each link associated with UE1, may receive information identifying a link quality for one or more links associated with other UEs (e.g., UE2-UE5) and/or BSs (e.g., BS1 and BS2), and/or the like. UE1 may generate a connectivity graph that identifies the one or more links associated with UE1, the one or more links associated with the other UEs and/or BSs, and the link qualities associated with the links identified in the connectivity graph. Based at least in part on the connectivity graph, UE1 may identify a route via which to transmit a communication to another UE, may identify alternate links and/or routes for re-routing a communication (e.g., if the route experiences a beam failure, a blocked beam, an MPE limitation, and/or another type of routing event), and/or the like.

As indicated above, UE2-UE5 and/or the BSs may also generate connectivity graphs for a portion of the wireless network (e.g., the same portion as UE1 and/or different portions). Accordingly, UE2-UE5 and/or the BSs may also perform one or more of the techniques described above in connection with reference numbers 502-506.

As indicated above, FIG. 5 is provided as one or more examples. Other examples may differ from what is described with respect to FIG. 5.

Figure 6A:
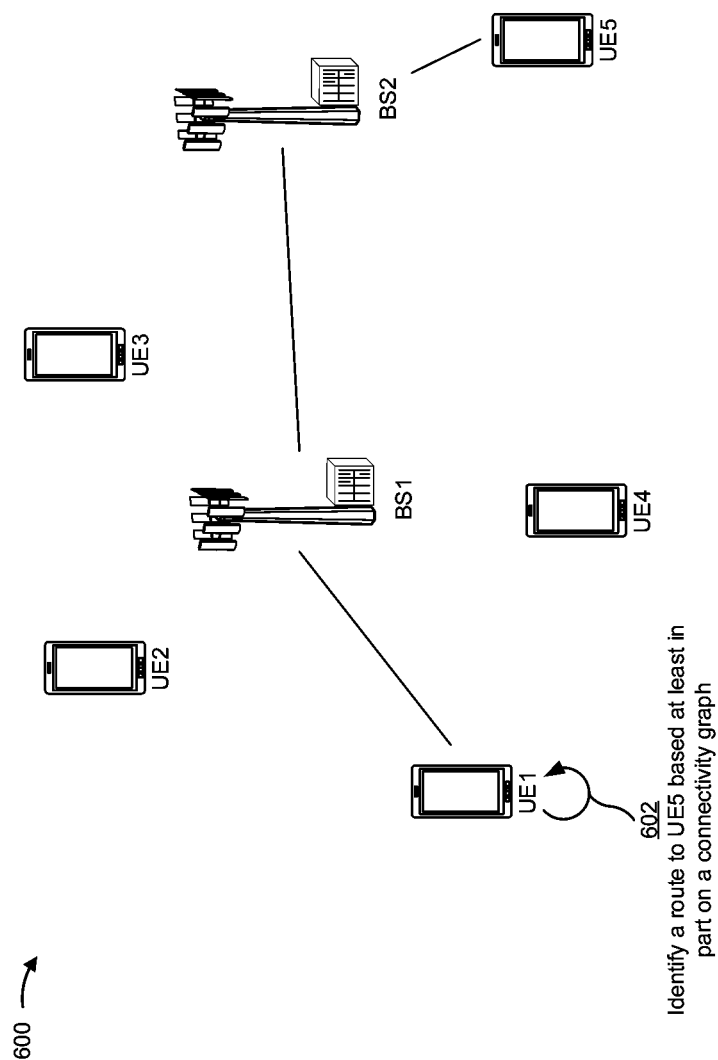
FIGS. 6A and 6B are diagrams illustrating one or more examples of using a connectivity graph for wireless network routing, in accordance with various aspects of the present disclosure.
Figure 6B:
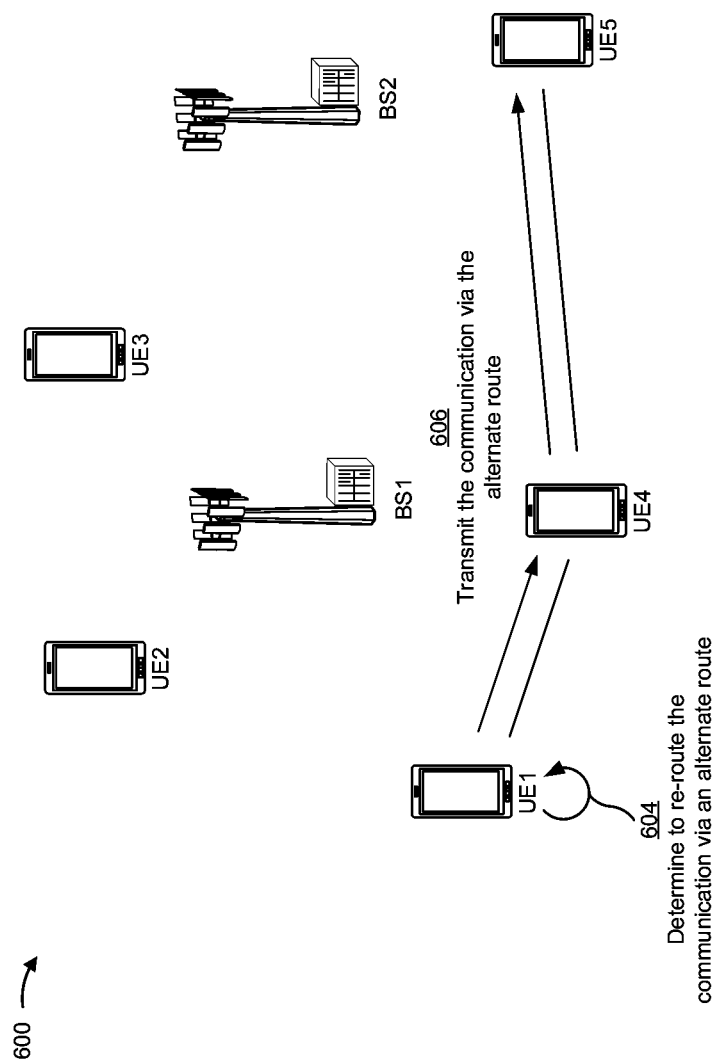

FIGS. 6A and 6B are diagrams illustrating one or more examples 500 of using a connectivity graph for wireless network routing, in accordance with various aspects of the present disclosure. As shown in FIGS. 6A and 6B, example(s) 600 may include a plurality of UEs (e.g., UEs 120), such as UE1-UE5, a plurality of BSs (e.g., BSs 110), such as BS1 and BS2, and/or the like. In some aspects, example(s) 600 may include greater or fewer quantities of UEs and/or BSs than those illustrated in FIGS. 6A and 6B.

In some aspects, UE1 may be scheduled to, or may determine to, transmit a communication to UE5. For example, UE5 may receive a scheduling grant from a serving BS (e.g., BS1) to transmit the communication to UE5, may be configured with a grant-free set of time-frequency resources in which to transmit the communication to UE5 (e.g., a configured grant), and/or the like.

As shown in FIG. 6A, and by reference number 602, UE1 may identify a route to UE5, via which to transmit the communication, based at least in part on a connectivity graph. As illustrated in FIG. 6A, the route may include one or more links between UE1, UE5, and/or other entities included in the wireless network. For example, the route may include a link between UE1 and BS1 (e.g., an uplink of an access link between UE1 and BS1), a link between BS1 and BS2 (e.g., a backhaul link between BS1 and BS2), and a link between BS2 and UE5 (e.g., a downlink of an access link between BS2 and UE5).

In some aspects, the connectivity graph may be configured and/or generated using one or more techniques described above in connection with FIG. 5 and/or other techniques. In this case, UE1 may identify the route by identifying a combination of one or more links between UE1 and UE5 included in the connectivity graph.

In some aspects, UE1 may identify the combination of one or more links based at least in part on one or more routing parameters, such as a route length parameter, a route quality parameter, a route weighting parameter, and/or the like. For example, the route length parameter may indicate that UE1 is to identify a combination of one or more links that results in the fewest quantity of links in the route and/or that satisfies a link quantity threshold. As another example, the route length parameter may indicate that UE1 is to identify links, for the route, that are associated with a link quality that satisfies a link quality threshold while minimizing the length of the route.

As another example, the route quality parameter may indicate that UE1 is to identify a combination of one or more links that results in a highest route quality and/or a route quality that satisfies a route quality threshold. UE1 may determine a route quality of the route based at least in part on the respective link qualities for each link included in the route. For example, UE1 may average or sum up the link qualities, may determine a link quality metric based at least in part on the link qualities, and/or the like.

In some aspects, UE1 may weight the route length of the route based at least in part on the route weighting parameter. For example, UE1 may weight the route length based at least in part on the route quality associated with the route, based at least in part on the link qualities associated with the links included in the route, and/or the like. In this case, the cost of a link may be increased as the link quality for the link decreases and/or may be decreased as the link quality for the link increases. The weighted route length may be the sum of the costs of the links on the route. In some aspects, UE1 may identify the route such that the weighted route length satisfies a weighted route length threshold, such that the weighted route length is minimized, and/or the like.

As shown in FIG. 6B, and by reference number 604, UE1 may determine to re-route the communication via an alternate route to UE5. The alternate route may include one or more links that are not included in the route, and may include one or more sidelinks (e.g., links between two UEs), access links (e.g., links between a UE and a BS), backhaul links (e.g., links between two BSs), and/or the like. For example, the one or more links may include a link between UE1 and UE4 (e.g., an outbound link of a sidelink between UE1 and UE4) and a link between UE4 and UE5 (e.g., an outbound link of a sidelink between UE4 and UE5).

In some aspects, UE1 may identify the alternate route using the connectivity graph. For example, UE1 may identify the alternate route by identifying the one or more links in the connectivity graph. In some aspects, UE1 may identify the alternate route such that the alternate route satisfies the one or more routing parameters. In some aspects, the one or more routing parameters may be relaxed for re-routing communications, or UE1 may identify the alternate route without regard to the one or more routing parameters.

In some aspects, UE1 may determine to re-route the communication based at least in part on determining that a beam associated with a link included in the route failed or is blocked, based at least in part on determining that the link is MPE limited, based at least in part on determining that a link quality for the link no longer satisfies a threshold link quality, and/or the like. As an alternative to re-routing, the UE may still transmit on the same link using a different beam that is not subject to the MPE limit (or allows higher transmit power while still obeying the MPE restrictions). However, re-routing may provide more robustness in case such alternative beams are not available.

As further shown in FIG. 6B, and by reference number 606, UE1 may transmit the communication to UE5 via the alternate route. For example, UE1 may transmit the communication to UE4 on the outgoing link of the sidelink between UE1 and UE4, and UE4 may transmit the communication to UE5 on the outgoing link of the sidelink between UE4 and UE5. In some aspects, UE1 may request that a time-frequency resource be reserved for transmitting the communication to UE4 on the sidelink between UE1 and UE4 (e.g., may transmit the request for a scheduling grant to a serving BS, to UE4, and/or the like). In some aspects, if a time-frequency resource is configured for transmitting communications to UE4 on the sidelink between UE1 and UE4 (e.g., one or more slots, symbols, subcarriers, and/or the like included in a receive resource pool configured for UE4 by a configured grant), UE1 may transmit the communication in the configured time-frequency resource.

In this way, UE1 may identify a route via which to transmit a communication to another UE based at least in part on the connectivity graph, may identify alternate links and/or routes for re-routing a communication (e.g., if the route experiences a beam failure, a blocked beam, an MPE limitation, and/or another type of routing event), and/or the like.

As indicated above, FIGS. 6A and 6B are provided as one or more examples. Other examples may differ from what is described with respect to FIGS. 6A and 6B.

FIG. 7 is a diagram illustrating an example process 700 performed, for example, by a first UE, in accordance with various aspects of the present disclosure. Example process 700 is an example where a UE (e.g., UE 120) performs operations associated with generating and/or using a connectivity graph for wireless network routing.

As shown in FIG. 7, in some aspects, process 700 may include determining a link quality for one or more links associated with the first UE, wherein a link quality for a link of the one or more links is based at least in part on one or more measurements associated with at least a subset of a plurality of beams of the link (block 710). For example, the first UE (e.g., using receive processor 258, transmit processor 264, controller/processor 280, memory 282, and/or the like) may determine a link quality for one or more links associated with the first UE, as described above. In some aspects, a link quality for a link of the one or more links is based at least in part on one or more measurements associated with at least a subset of a plurality of beams of the link.

As further shown in FIG. 7, in some aspects, process 700 may include generating, based at least in part on the link quality for the one or more links associated with the first UE, a connectivity graph of at least a portion of a wireless network in which the first UE is included, wherein the connectivity graph identifies the one or more links associated with the first UE and respective link qualities for each of the one or more links associated with the first UE, and at least one of one or more links associated with a second UE included in at least the portion of the wireless network and respective link qualities for each of the one or more links associated with the second UE, or one or more links associated with a BS included in at least the portion of the wireless network and respective link qualities for each of the one or more links associated with the BS (block 720). For example, the first UE (e.g., using receive processor 258, transmit processor 264, controller/processor 280, memory 282, and/or the like) may generate, based at least in part on the link quality for the one or more links associated with the first UE, a connectivity graph of at least a portion of a wireless network in which the first UE is included, as described above. In some aspects, the connectivity graph identifies, the one or more links associated with the first UE and respective link qualities for each of the one or more links associated with the first UE, and at least one of one or more links associated with a second UE included in at least the portion of the wireless network and respective link qualities for each of the one or more links associated with the second UE, or one or more links associated with a BS included in at least the portion of the wireless network and respective link qualities for each of the one or more links associated with the BS.

As further shown in FIG. 7, in some aspects, process 700 may include identifying, using the connectivity graph, a route to a third UE included in at least the portion of the wireless network (block 730). For example, the first UE (e.g., using receive processor 258, transmit processor 264, controller/processor 280, memory 282, and/or the like) may identify, using the connectivity graph, a route to a third UE included in at least the portion of the wireless network, as described above.

Process 700 may include additional aspects, such as any single aspect or any combination of aspects described below and/or in connection with one or more other processes described elsewhere herein.

In a first aspect, the one or more links associated with the first UE comprise at least one of an inbound link of a sidelink between the first UE and the second UE, an outbound link of the sidelink between the first UE and the second UE, a downlink of an access link between the first UE and the BS, or an uplink of the access link. In a second aspect, alone or in combination with the first aspect, the one or more links associated with the second UE comprise at least one of an inbound link of a sidelink between the second UE and a third UE included in at least the portion of the wireless network, an outbound link of the sidelink between the second UE and the third UE, or a downlink of an access link between the second UE and the BS, or an uplink of the access link.

In a third aspect, alone or in combination with one or more of the first and second aspects, the one or more links associated with the first UE comprise at least one of a downlink of an access link between the second UE and the BS, an uplink of the access link between the second UE and the BS, or a link between the BS and another BS or network node included in at least the portion of the wireless network. In a fourth aspect, alone or in combination with one or more of the first through third aspects, process 700 further comprises identifying, using the connectivity graph, a route to a third UE included in at least the portion of the wireless network based at least in part on at least one of a route length of the route to the third UE, a route quality of the route to the third UE, the link quality for the one or more links associated with the first UE, or a link quality for the one or more links associated with the second UE.

In a fifth aspect, alone or in combination with one or more of the first through fourth aspects, identifying the route to the third UE comprises identifying the route to the third UE such that the route length of the route to the third UE satisfies a route length threshold and the route quality of the route to the third UE satisfies a route quality threshold. In a sixth aspect, alone or in combination with one or more of the first through fifth aspects, identifying the route to the third UE comprises identifying the route to the third UE such that a weight of the route length of the route to the third UE satisfies a weight threshold, wherein the weight of the route length is based at least in part on the route quality of the route to the third UE.

In a seventh aspect, alone or in combination with one or more of the first through sixth aspects, the one or more measurements comprise at least one of a reference signal received power measurement, a reference signal received quality measurement, a reference signal received signal-to-noise or signal-to-interference-and-noise ratio, a received signal strength indicator measurement, a channel quality indicator measurement, or a block error rate measurement. In an eighth aspect, alone or in combination with one or more of the first through seventh aspects, the at least the subset of the plurality of beams is based at least in part on the one or more measurements and the at least the subset of the plurality of beams not experiencing a failure in a particular quantity of slots.

In a ninth aspect, alone or in combination with one or more of the first through eighth aspects, one or more parameters for the one or more measurements comprise at least one of a quantity of the subset of the plurality of beams, the particular quantity of slots, a measurement bandwidth of the one or more measurements, or a time duration of the one or more measurements. In a tenth aspect, alone or in combination with one or more of the first through ninth aspects, one or more parameters for the one or more measurements, and one or more other parameters for one or more other measurements associated with another link included in the one or more links associated with the first UE, are different parameters.

In an eleventh aspect, alone or in combination with one or more of the first through tenth aspects, one or more parameters for the one or more measurements, and one or more other parameters for one or more other measurements associated with another link included in the one or more links associated with the first UE, are the same parameters. In a twelfth aspect, alone or in combination with one or more of the first through eleventh aspects, the method further comprises performing the one or more measurements for a beam of the plurality of beams based at least in part on a change to a transmit power of the beam, wherein the change to the transmit power of the beam is based at least in part on at least one of an MPE limitation of the beam or the beam being scheduled to carry additional communications.

In a thirteenth aspect, alone or in combination with one or more of the first through twelfth aspects, the one or more measurements are associated with a first beam of the link, process 700 further comprises determining a signal strength for a second beam of the link based at least in part on the one or more measurements associated with the first beam, and determining the link quality for the one or more links associated with the first UE comprises determining the link quality for the link based at least in part on the signal strength for the second beam. In a fourteenth aspect, alone or in combination with one or more of the first through thirteenth aspects, process 700 includes storing, at the first UE, information identifying the connectivity graph.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a first UE, in accordance with various aspects of the present disclosure. Example process 800 is an example where a UE (e.g., UE 120) performs operations associated with generating and/or using a connectivity graph for wireless network routing.

As shown in FIG. 8, in some aspects, process 800 may include identifying a route to a second UE, via which to transmit a communication to the second UE, based at least in part on a connectivity graph of at least a portion of a wireless network in which the first UE and the second UE are included (block 810). For example, the first UE (e.g., using receive processor 258, transmit processor 264, controller/processor 280, memory 282, and/or the like) may identify a route to a second UE, via which to transmit a communication to the second UE, based at least in part on a connectivity graph of at least a portion of a wireless network in which the first UE and the second UE are included, as described above.

As further shown in FIG. 8, in some aspects, process 800 may include determining to re-route the communication from a first link included in the route to a second link identified in the connectivity graph (block 820). For example, the first UE (e.g., using receive processor 258, transmit processor 264, controller/processor 280, memory 282, and/or the like) may determine to re-route the communication from a first link included in the route to a second link identified in the connectivity graph, as described above.

As further shown in FIG. 8, in some aspects, process 800 may include transmitting the communication on a beam associated with the second link (block 830). For example, the first UE (e.g., using receive processor 258, transmit processor 264, controller/processor 280, memory 282, and/or the like) may transmit the communication on a beam associated with the second link, as described above.

Process 800 may include additional aspects, such as any single aspect or any combination of aspects described below and/or in connection with one or more other processes described elsewhere herein.

In a first aspect, the first link is to a third UE or a first BS, and the second link is to a fourth UE or a second BS. In a second aspect, alone or in combination with the first aspect, determining to re-route the communication from the first link to the second link comprises determining to re-route the communication from the first link to the second link based at least in part on determining that a beam associated with the first link is blocked or MPE limited. In a third aspect, alone or in combination with one or more of the first and second aspects, transmitting the communication on the beam associated with the second link comprises at least one of transmitting the communication on the beam associated with the second link to a third UE in a slot that is included in a receive resource pool associated with the third UE, or transmitting the communication on the beam associated with the second link to the third UE based at least in part on receiving a scheduling grant from the third UE or a base station.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first user equipment (UE), comprising:
   determining a link quality for one or more links associated with the first UE,
      wherein a link quality for a link of the one or more links is based at least in part on one or more measurements associated with at least a subset of a plurality of beams of the link;

generating, based at least in part on the link quality for the one or more links associated with the first UE, a connectivity graph of at least a portion of a wireless network in which the first UE is included,
wherein the connectivity graph identifies:
the one or more links associated with the first UE and respective link qualities for each of the one or more links associated with the first UE, and
at least one of:
one or more links associated with a second UE included in at least the portion of the wireless network and respective link qualities for each of the one or more links associated with the second UE, or
one or more links associated with a base station (BS) included in at least the portion of the wireless network and respective link qualities for each of the one or more links associated with the BS; and
identifying, using the connectivity graph, a route to a third UE included in at least the portion of the wireless network.

2. The method of claim 1, wherein the one or more links associated with the first UE comprise at least one of:
an inbound link of a sidelink between the first UE and the second UE,
an outbound link of the sidelink between the first UE and the second UE,
a downlink of an access link between the first UE and the B S, or
an uplink of the access link.

3. The method of claim 1, wherein the one or more links associated with the second UE comprise at least one of:
an inbound link of a sidelink between the second UE and a third UE included in at least the portion of the wireless network,
an outbound link of the sidelink between the second UE and the third UE, or
a downlink of an access link between the second UE and the BS, or
an uplink of the access link.

4. The method of claim 1, wherein the one or more links associated with the BS comprise at least one of:
a downlink of an access link between the second UE and the BS,
an uplink of the access link between the second UE and the BS, or
a link between the BS and another BS or network node included in at least the portion of the wireless network.

5. The method of claim 1, wherein identifying the rout to the third UE comprises:
identifying, using the connectivity graph, the route to the third UE based at least in part on at least one of:
a route length of the route to the third UE,
a route quality of the route to the third UE,
the link quality for the one or more links associated with the first UE, or
a link quality for the one or more links associated with the second UE.

6. The method of claim 5, wherein identifying the route to the third UE comprises:
identifying the route to the third UE such that:
the route length of the route to the third UE satisfies a route length threshold, and
the route quality of the route to the third UE satisfies a route quality threshold.

7. The method of claim 5, wherein identifying the route to the third UE comprises:
identifying the route to the third UE such that a weight of the route length of the route to the third UE satisfies a weight threshold,
wherein the weight of the route length is based at least in part on the route quality of the route to the third UE.

8. The method of claim 1, wherein the one or more measurements comprise at least one of:
a reference signal received power measurement,
a reference signal received quality measurement
a reference signal received signal-to-noise or signal-to-interference-and-noise ratio,
a received signal strength indicator measurement,
a channel quality indicator measurement, or
a block error rate measurement.

9. The method of claim 1, wherein the at least the subset of the plurality of beams is based at least in part on:
the one or more measurements, and
the at least the subset of the plurality of beams not experiencing a failure in a particular quantity of slots.

10. The method of claim 9, wherein one or more parameters for the one or more measurements comprise at least one of:
a quantity of the subset of the plurality of beams,
the particular quantity of slots,
a measurement bandwidth of the one or more measurements, or
a time duration of the one or more measurements.

11. The method of claim 10, wherein one or more parameters for the one or more measurements, and one or more other parameters for one or more other measurements associated with another link included in the one or more links associated with the first UE, are different parameters.

12. The method of claim 10, wherein one or more parameters for the one or more measurements, and one or more other parameters for one or more other measurements associated with another link included in the one or more links associated with the first UE, are same parameters.

13. The method of claim 1, further comprising:
storing, at the first UE, information identifying the connectivity graph.

14. A first user equipment (UE) for wireless communication, comprising:
a memory; and
one or more processors operatively coupled to the memory, the memory and the one or more processors configured to:
determine a link quality for one or more links associated with the first UE,
wherein a link quality for a link of the one or more links is based at least in part on one or more measurements associated with at least a subset of a plurality of beams of the link;
generate, based at least in part on the link quality for the one or more links associated with the first UE, a connectivity graph of at least a portion of a wireless network in which the first UE is included,
wherein the connectivity graph identifies:
the one or more links associated with the first UE and respective link qualities for each of the one or more links associated with the first UE, and
at least one of:
one or more links associated with a second UE included in at least the portion of the wireless network and respective link qualities for each of the one or more links associated with the second UE, or one or more links associated with a base station (BS) included in at least the portion of the wireless network and respective link qualities for each of the one or more links associated with the BS; and identify, using the connectivity graph, a route to a third UE included in at least the portion of the wireless network.

15. The UE of claim 14, wherein the one or more processors are further to:

store, at the first UE, information identifying the connectivity graph.

16. The first UE of claim 14, wherein the one or more measurements comprise at least one of:

a reference signal received power measurement,
a reference signal received quality measurement
a reference signal received signal-to-noise or signal-to-interference-and-noise ratio,
a received signal strength indicator measurement,
a channel quality indicator measurement, or
a block error rate measurement.

17. The first UE of claim 14, wherein the at least the subset of the plurality of beams is based at least in part on:

the one or more measurements, and
the at least the subset of the plurality of beams not experiencing a failure in a particular quantity of slots.

18. The first UE of claim 17, wherein one or more parameters for the one or more measurements comprise at least one of:

a quantity of the subset of the plurality of beams,
the particular quantity of slots,
a measurement bandwidth of the one or more measurements, or
a time duration of the one or more measurements.

19. The first UE of claim 18, wherein one or more parameters for the one or more measurements, and one or more other parameters for one or more other measurements associated with another link included in the one or more links associated with the first UE, are different parameters.

20. The first UE of claim 18, wherein one or more parameters for the one or more measurements, and one or more other parameters for one or more other measurements associated with another link included in the one or more links associated with the first UE, are same parameters.

21. The first UE of claim 14, wherein the one or more processors are further configured to:

perform the one or more measurements for a beam of the plurality of beams based at least in part on a change to a transmit power of the beam,
wherein the change to the transmit power of the beam is based at least in part on at least one of:
a maximum permissible exposure (MPE) limitation of the beam, or
the beam being scheduled to carry additional communications.

22. The first UE of claim 14, wherein the one or more measurements are associated with a first beam of the link; and wherein the one or more processors are further configured to:
determine a signal strength for a second beam of the link based at least in part on the one or more measurements associated with the first beam; and
wherein the one or more processors, when determining the link quality for the one or more links associated with the first UE, are to:
determine the link quality for the link based at least in part on the signal strength for the second beam.

* * * * *